(12) United States Patent
Linstead

(10) Patent No.: US 7,890,459 B1
(45) Date of Patent: Feb. 15, 2011

(54) NON-DISRUPTIVE MODIFICATION OF DATA IN-PLACE

(75) Inventor: Paul Linstead, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 436 days.

(21) Appl. No.: 12/079,234

(22) Filed: Mar. 25, 2008

(51) Int. Cl.
*G06F 17/30* (2006.01)

(52) U.S. Cl. .................. 707/610; 707/617; 707/618

(58) Field of Classification Search .......... 707/610, 707/655, 656, 657, 617, 618
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,366,986 B1 | 4/2002 | St. Pierre et al. | |
| 6,499,036 B1* | 12/2002 | Gurevich | 707/778 |
| 6,874,046 B1 | 3/2005 | LeCrone et al. | |
| 7,111,016 B2* | 9/2006 | Gurevich | 717/108 |
| 7,472,195 B2* | 12/2008 | Burckart et al. | 709/228 |
| 7,568,051 B1* | 7/2009 | Linstead | 710/1 |
| 7,577,690 B2* | 8/2009 | Chandrasekaran et al. | 1/1 |
| 2005/0108723 A1* | 5/2005 | Burckart et al. | 719/313 |
| 2006/0069887 A1 | 3/2006 | LeCrone et al. | |
| 2006/0242431 A1 | 10/2006 | LeCrone et al. | |
| 2009/0064181 A1* | 3/2009 | Burckart et al. | 719/313 |

* cited by examiner

*Primary Examiner*—Jean M Corrielus
(74) *Attorney, Agent, or Firm*—Muirhead and Saturnelli, LLC

(57) ABSTRACT

Non-disruptive modification of data in-place includes generating a copy of source data to a holding area. Data modification, such as encryption and/or other transformation process, may be performed on the source data in the source area while I/O operations of applications needing access to the source data is diverted to the data copy in the holding area. Updates to the data copy in the holding area from the continued I/O operations are tracked and the data updates are modified and transferred to the source area. Following successful modification of the source data, the I/O operations of the applications are re-directed back to the source area having the newly modified source data. The holding area may then be freed for subsequent use.

20 Claims, 10 Drawing Sheets

NON-DISRUPTIVE MODIFICATION OF DATA IN-PLACE

TECHNICAL FIELD

The present application is related to the field of data storage for computers and, more particularly, to modification of data on a storage device.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In-place data modification involves the translation, transformation and/or other modification of data on a storage device while that data is being actively accessed by one or more applications. In-place data modification techniques may include in-place encryption (or re-encryption) of data. A known approach for in-place data modification is the disruptive unloading of data to be modified and the reloading of the newly formatted or encrypted data. However, the disruptive unload/reload approach has the disadvantage that applications cannot access the data during the unload/reload process. Another approach involves the non-disruptive migration of data to a new device, such as by using Logical Data Migration Facility (LDMF). However, a non-disruptive migration tool may require increased permanent space requirements and data is not backed-up while the data is being transformed.

Accordingly, it would be desirable to provide a system that facilitates non-disruptive access of an application to data undergoing in-place data modification on a source device without needing extra permanent migration space and with less risk of data loss.

SUMMARY OF THE INVENTION

According to the system described herein, a method for modification of data includes copying source data in a source storage area into a holding storage area to create a data copy, wherein the source data is data that is to be modified. I/O operations of an application that accesses the source data may be diverted to the data copy in the holding storage area. Changes to the data copy in the holding storage area may be tracked. The source data may be modified, for example encrypted, to generate modified source data in the source storage area. The changes to the data copy in the holding storage area may be incorporated into the modified source data in the source area. Further, the I/O operations may be re-directed to the modified source data in the source storage area. After incorporating the changes to the data copy into the modified source data, storage space in the holding storage area may be made available for subsequent use and/or the data copy may be maintained in the holding storage area as a back-up data copy. Incorporating the changes to the data copy into the modified source data may include modifying the changes to the data copy and transferring the modified changes to the source storage area. Tracking changes to data copy may include using an SDDF session.

The I/O operations may be suspended if a number of changes to the data copy is less than a threshold limit. Final remaining changes to the data copy may be modified, for example encrypted, as final modified changes. The final modified changes may be transferred to the modified source data. The I/O operations may be re-directed to the modified source data in the source storage area and the I/O operations may then be resumed (i.e., the I/O operations may be resumed by the original source).

According further to the system described herein, a storage device includes a source storage area, a holding storage area, and at least one processor including executable code stored on a computer-readable medium. Executable code may be included that copies source data in a source storage area into a holding storage area to create a data copy, wherein the source data is data that is to be modified. Executable code may be included that diverts I/O operations of an application that accesses the source data to the data copy in the holding storage area. Executable code may be included that tracks changes to the data copy in the holding storage area. Executable code may be included that modifies the source data, such as by encryption, to generate modified source data in the source storage area. Executable code may be included that incorporates the changes to the data copy in the holding storage area into the modified source data in the source area. Further, executable code may be included that re-directs the I/O operations to the modified source data in the source storage area. Executable code may be included that, after incorporating the changes to the data copy into the modified source data, makes storage space in the holding storage area available for subsequent use and/or maintains the data copy in the holding storage area as a back-up data copy. Executable code may be included that incorporates the changes to the data copy into the modified source data includes executable code that modifies the changes to the data copy and transfers the modified changes to the source storage area. The executable code that tracks changes to data copy may include executable code used in an SDDF session.

Executable code may be included that suspends the I/O operations if a number of changes to the data copy is less than a threshold limit. Executable code may be included that modifies final remaining changes to the data copy as final modified changes. Executable code may be included that transfers the final modified remaining changes to the modified source data. Executable code may be included that re-directs the I/O operations to the modified source data in the source storage area. Executable code may be included that resumes the I/O operations.

A plurality of interconnected directors may be included in the storage device, wherein at least some of the directors handle reading and writing data for the storage device, and wherein at least one of the directors includes the at least one processor.

According further to the system described herein, computer software, stored on a computer-readable medium, for modifying data in-place includes executable code that copies source data in a source storage area into a holding storage area to create a data copy, wherein the source data is data that is to be modified. Executable code may be included that diverts I/O operations of an application that accesses the source data to the data copy in the holding storage area. Executable code may be included that tracks changes to the data copy in the holding storage area. Executable code may be included that modifies the source data to generate modified source data in the source storage area. Executable code may be included that incorporates the changes to the data copy in the holding storage area into the modified source data in the source area. The executable code that incorporates the changes to the data copy into the modified source data includes executable code that modifies the changes to the data copy and transfers the modified changes to the source storage area. Executable code may be included that suspends the I/O operations if a number of changes to the data copy is less than a threshold limit. Executable code may be included that modifies final remaining changes to the data copy as final modified changes. Executable code may be included that transfers the final modified remaining changes to the modified source data. Executable code may be included that re-directs the I/O operations to the modified source data in the source storage area. Executable code may be included that resumes the I/O operations.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
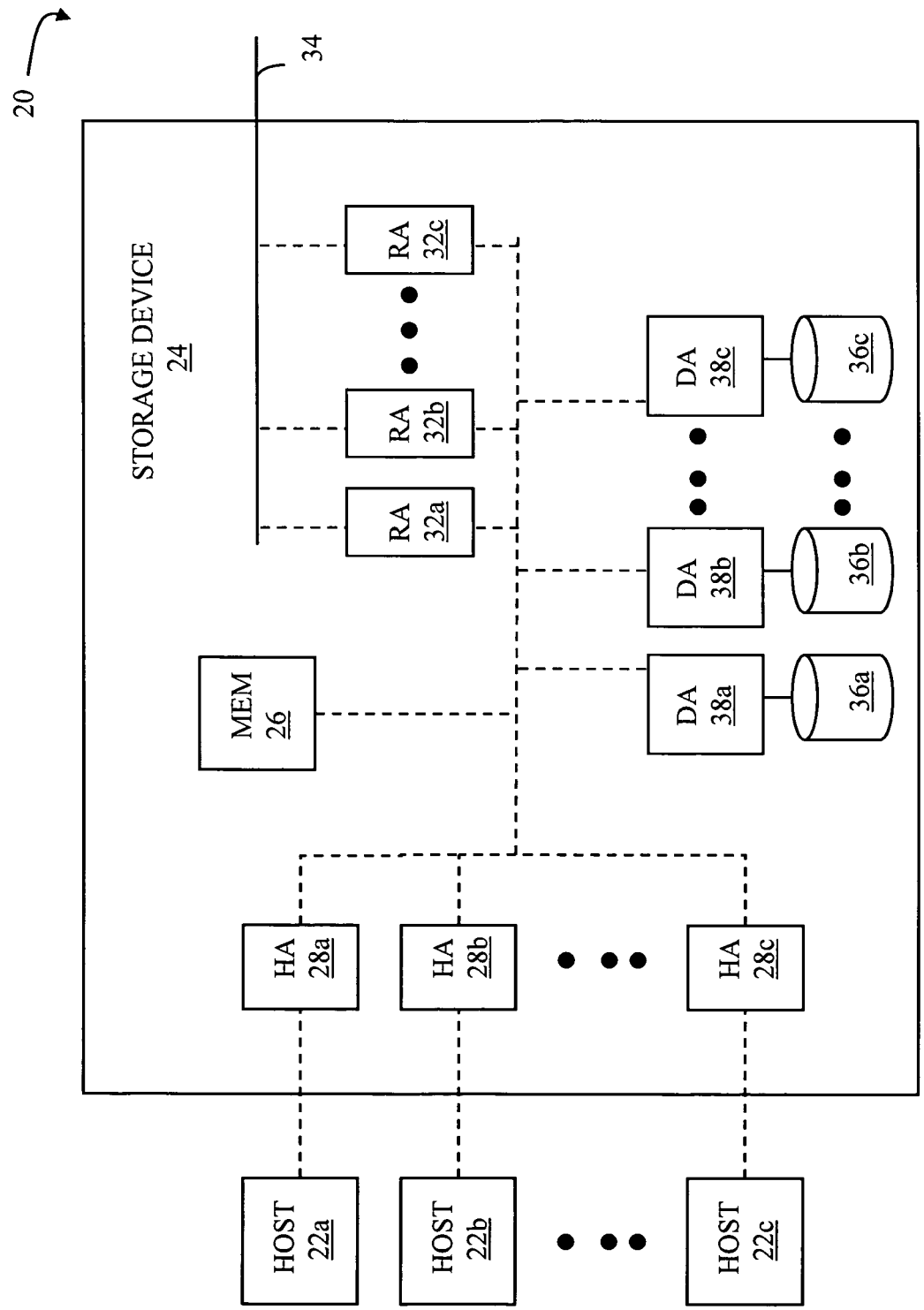
FIG. 1 is a schematic diagram showing a plurality of hosts and a data storage device that may be used in connection with the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

In FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34. For further discussion of RDF and the use thereof in data recovery and storage techniques, see U.S. Pat. No. 5,742,792, which is incorporated by reference herein, and U.S. Patent App. Pub. No. 2006-0069887 to LeCrone, et al., entitled "Triangular Asynchronous Replication," which is incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
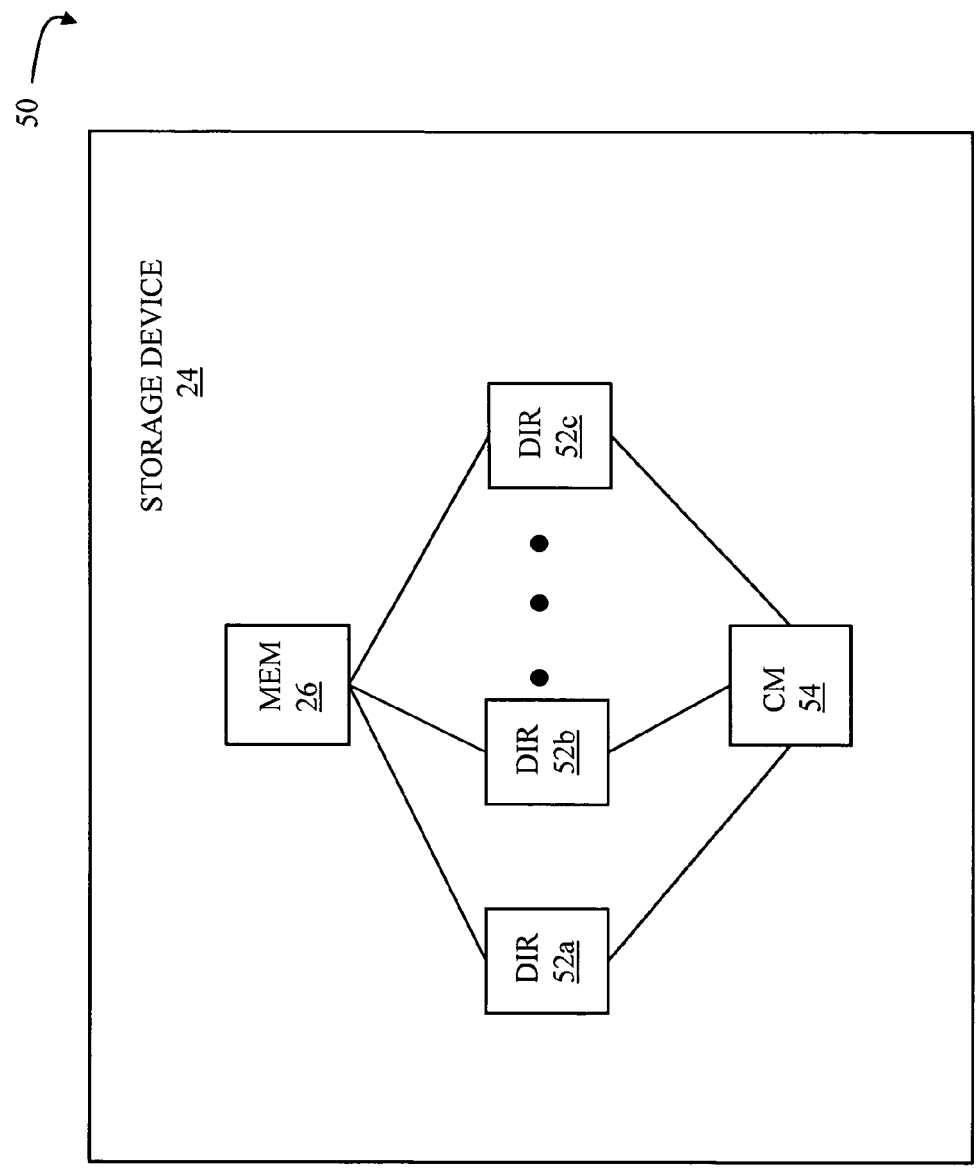
FIG. 2 is a schematic diagram showing a storage device, memory, a plurality of directors, and a communication module that may be used in connection with the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, all or at least part of the global memory 26 may be provided on one or more of the directors 52a-52c and shared with other ones of the directors 52a-52c.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

FIGS. 3-8 are schematic illustrations of a system 100 performing in-place data modification, such as data transformation, translation, formatting, encryption, re-encryption and/or other data modification technique, according to an embodiment of the system described herein. Specific implementations and embodiments of the steps schematically shown in FIGS. 3-8 are further discussed in connection with flow diagrams and processes described elsewhere herein.

Figure 3:
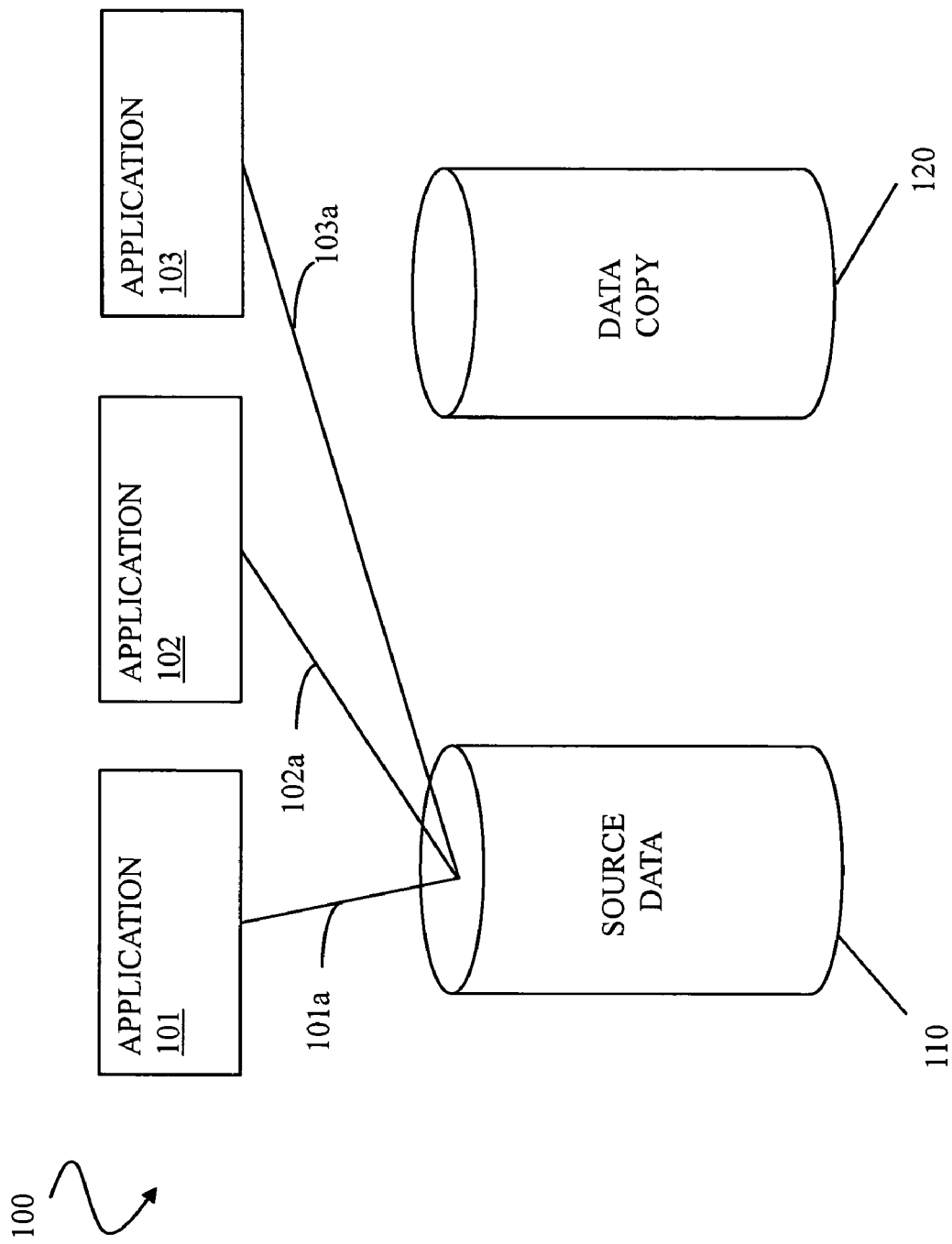
FIGS. 3-8 are schematic illustrations of a system performing in-place data modification, such as data transformation, translation, encryption and/or other data modification technique, according to an embodiment of the system described herein.

FIG. 3 shows applications 101, 102, 103 of the system 100 conducting I/O data operations, such as read/write operations, on source data in a source area 110, such as one or more storage devices, standard logical devices and/or other logical or physical portions thereof. The I/O connections of the applications 101-103 with the source area 110 are shown as connections 101a, 102a, 103a. Although three applications are illustrated, fewer or more than this number may be used in connection with the system described herein. A mirror of the source data is created in a holding area 120 that may be the same or a different one of the storage device, standard logical device and/or other logical or physical portions thereof, including multiple portions spread across one or more devices. In an embodiment, the holding area 120 may be a temporary data buffer that is used only during the in-place data modification process, as further discussed elsewhere herein. Note that the applications 101-103 are schematically shown connected to the source area 110; however, one or more component layers may exist between the applications 101-103 and the source area 110 and/or holding area 120. For example, the source area 110 and the holding area 120 may be part of a storage device having components discussed elsewhere herein, such as HAs, DAs, etc., and it is the components that facilitate the I/O operations of the applications 101-103 with the source area 110 and/or holding area 120 in connection with system described herein. Other appropriate hardware and/or software layers may also be used between applications 101-103 and the source area 110 and/or the holding area 120.

An example of a data mirroring technique that may be used in connection with the system described herein involves the use of Business Continuance Volumes (BCVs). BCVs are devices that can mirror standard logical devices. The BCV allows for a consistent copy of data on the standard logical device to be maintained and then independently allows another application to act on the data copy while letting the host perform data operations to the standard device, such as the in-place data modification processes in accordance with the system described herein. A BCV device can also be split from its standard logical device after being mirrored and can be resynchronized (i.e., reestablished as a mirror) to the standard logical devices after being split. In addition, a BCV can be remotely mirrored using RDF, in which case the BCV may propagate data changes made thereto (while the BCV is acting as a mirror) to the BCV remote mirror when the BCV is split from the corresponding standard logical device. BCVs, and data operations used in connection therewith, are further described, for example, in U.S. Pat. No. 6,101,497 to Ofek, entitled "Method and apparatus for independent and simultaneous access to a common data set," which is incorporated herein by reference. Of course, any other appropriate data mirroring technique may be used, including the commercially-available Logical Data Migration Facility (LDMF) mechanism.

Other suitable data mirroring, copying and/or replication systems and processes may be used in connection with the system described herein. For example, known techniques of snap copying may be used that provide for the quick copying of data, for example, involving the copying of data pointer sets.

Figure 4:
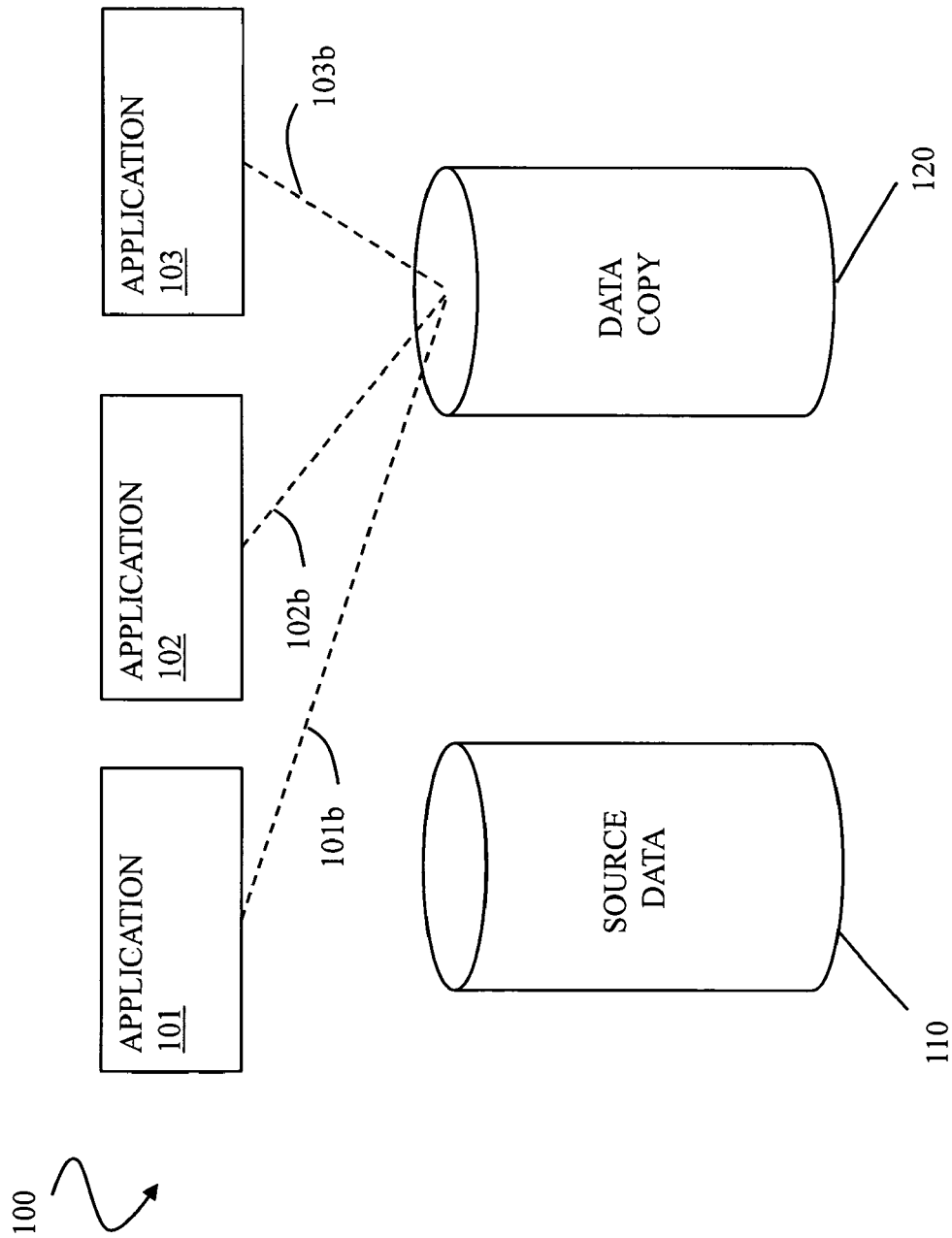

As shown in FIG. 4, the applications 101-103 requesting access to the original source data are temporarily diverted or otherwise redirected to the holding area 120, shown by I/O connections 101b, 102b, 103b illustrated as dotted lines to emphasize the temporary nature of the connections, such that the applications 101-103 conduct I/O operations to the data copy in the holding area 120. In an embodiment, the applications 101-103 are unaware of the diverting of I/O operations to the data copy in the holding area 120. The diverting process of the applications 101-103 may be controlled by one or more components of a storage device, as discussed elsewhere herein, including, for example, one or more of the host adapters (HAs). Commercially-available products that perform this function include the PowerPath product provided by EMC Corporation of Hopkinton, Mass., LDMF and/or mechanisms disclosed in U.S. Pat. No. 6,874,046, which is incorporated by reference herein.

Figure 5:
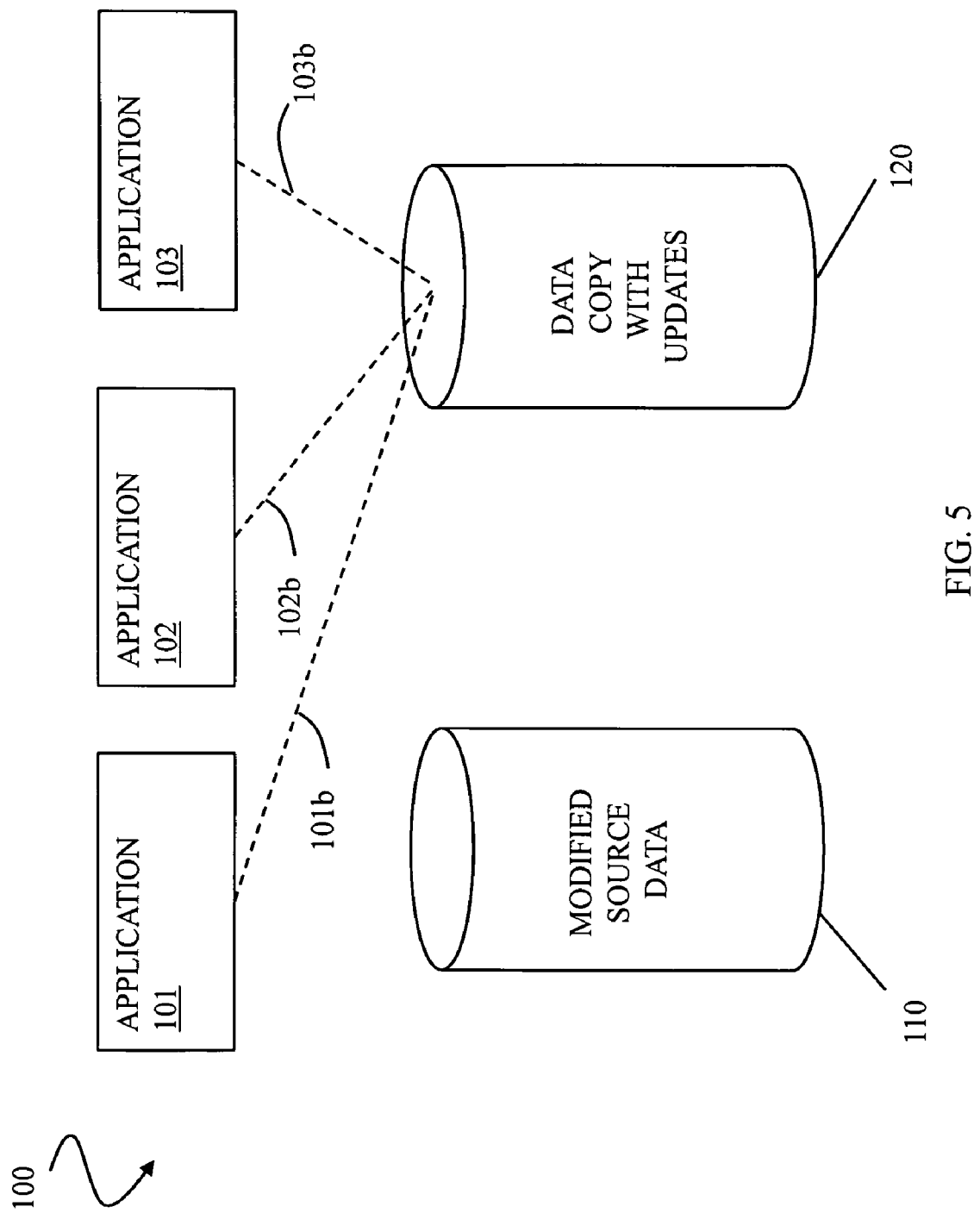

FIG. 5 shows that the source data in the storage area 110 has undergone an in-place data modification process that may include, as further discussed elsewhere herein, transformation, translation, formatting, encryption, re-encryption and/or other data modification technique. While the source data of the storage area 110 is modified by the data modification process to produce modified source data, the applications 101-103 conduct I/O operations on the data copy stored in the holding area 120. Accordingly, the data copy in the holding area 120 contains updated data that have not yet been integrated into the data in the storage area 110. In this way, I/O operations of the applications 101-103 have continued even while the original source data has been subject to in-place data modification. As further discussed elsewhere herein, in an embodiment the applications 101-103 are unaware that the I/O operations have been conducted on the data copy rather than the source data.

The changes made by the one or more applications 101-103 to the data copy in the holding area 120 during the in-place data modification process may be tracked using Symmetrix Differential Data Facility (SDDF), as further discussed elsewhere herein. SDDF allows for a plurality sessions, each having a bitmap associated therewith bits that are set (e.g., to a logical one) whenever there is a write to a corresponding data location during a particular time period. If no write occurs to a particular location, the corresponding bit remains cleared (e.g., remains set to a logical zero). In an embodiment herein, each bit may correspond to a track of data. However, for other embodiments, it is possible to have each bit correspond to larger or smaller increments of data and it is also possible that different bits and/or different sets of bits correspond to different amounts of data. Note that it is possible to use any appropriate mechanism to track data changes, including simulated SDDF mechanism.

Operations associated with an SDDF session include creating an SDDF session, activating an SDDF session, clearing bits of the bitmap for an SDDF session, deactivating an SDDF session, and terminating an SDDF session. Creating an SDDF session, clearing the bits thereof, and terminating an SDDF session are relatively self-explanatory. Activating an SDDF session causes a bit of the SDDF session bitmap to be set whenever a corresponding track (or other appropriate data increment) is written. Deactivating an SDDF session suspends the setting of bits. The SDDF mechanism discussed herein may be implemented using the description provided in U.S. Pat. No. 6,366,986 to St. Pierre, et al., entitled "Method and apparatus for differential backup in a computer storage system," and U.S. Patent App. Pub. No. 2006-0069887, cited elsewhere herein, which are incorporated herein by reference.

Figure 6:
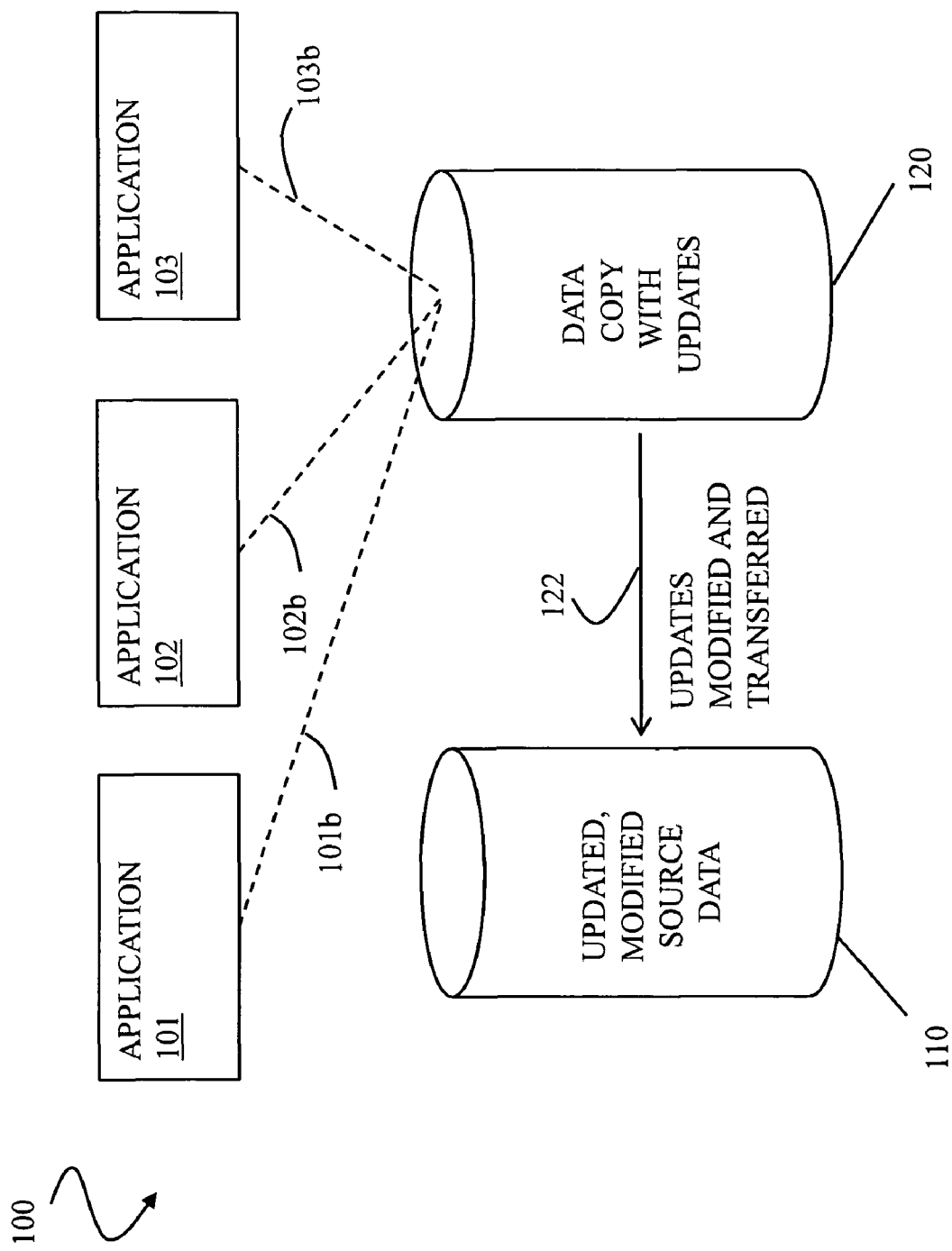

FIG. 6 illustrates the transfer of updates to the data copy from the holding area 120 to the modified source data in the source area 110, graphically shown by an arrow 122 between the holding area 120 and the source area 110 to represent the transfer of modified data. In order for the updates to the data copy resulting from the on-going I/O operations conducted by the applications 101-103 on the data copy to be properly merged and/or otherwise incorporated into the source data in the source area 110, the updates may be modified using the similar data modification process that is conducted on the source data. The modification and incorporation of the updates yields modified and updated source data at the source area 110. Tracking of updates to the data copy may be performed using an SDDF session (simulated or otherwise) with an SDDF map and the updates modified and transferred to the modified source data at the source area 110, as further discussed elsewhere herein.

Figure 7:
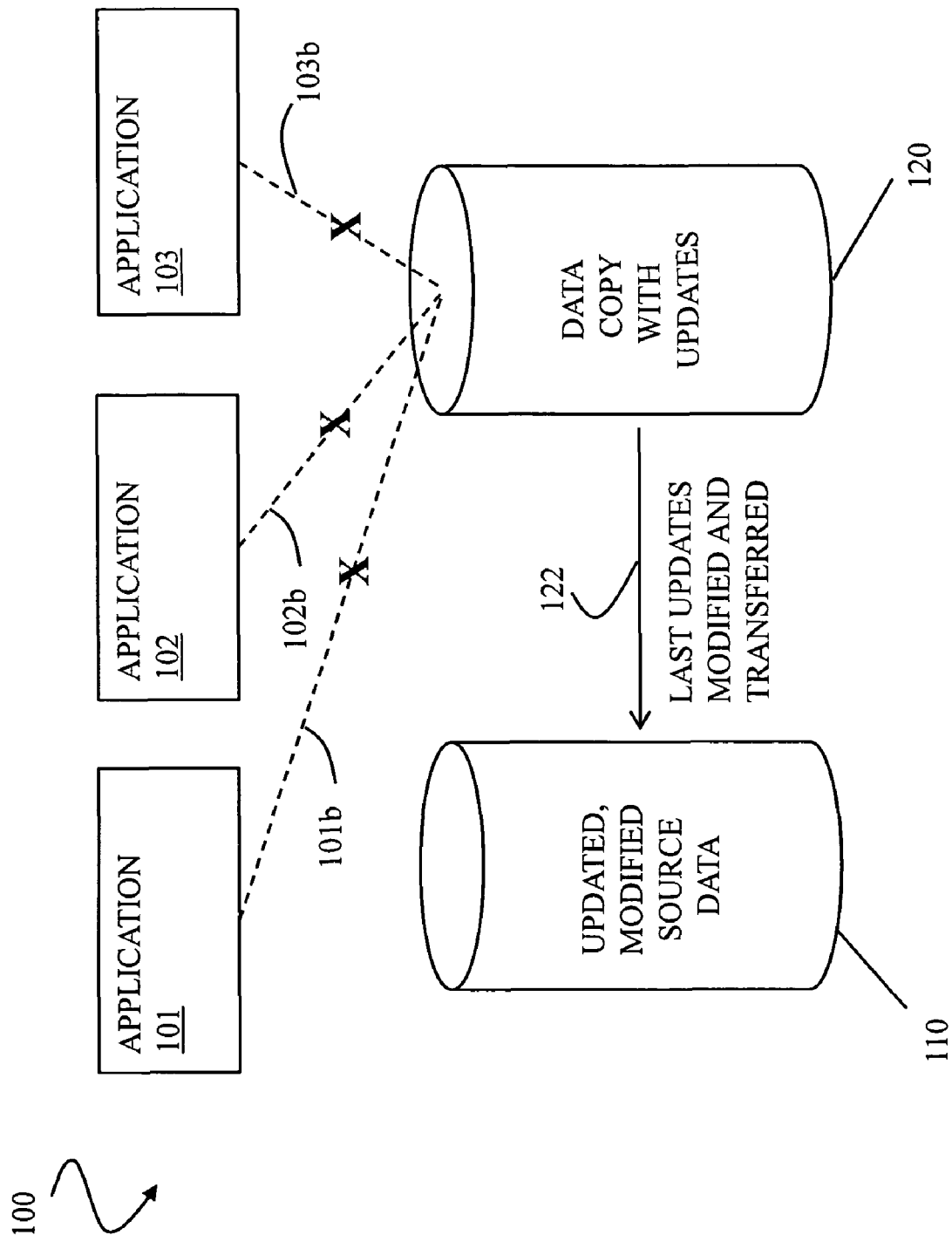

FIG. 7 shows final stages of the in-place data modification process according to the system described herein. Once the changed tracks in the SDDF map are reduced to some threshold, access to the holding area 120 is temporarily suspended and the last tracks are modified, according to the in-place data modification process performed on the source data, and transferred to the updated, modified source data at the source area 110. The temporary suspension of I/O operations may be for a length of time that is not registered by the applications 101-103 and/or registered as a temporary pause that does not affect operations of the applications 101-103.

Figure 8:
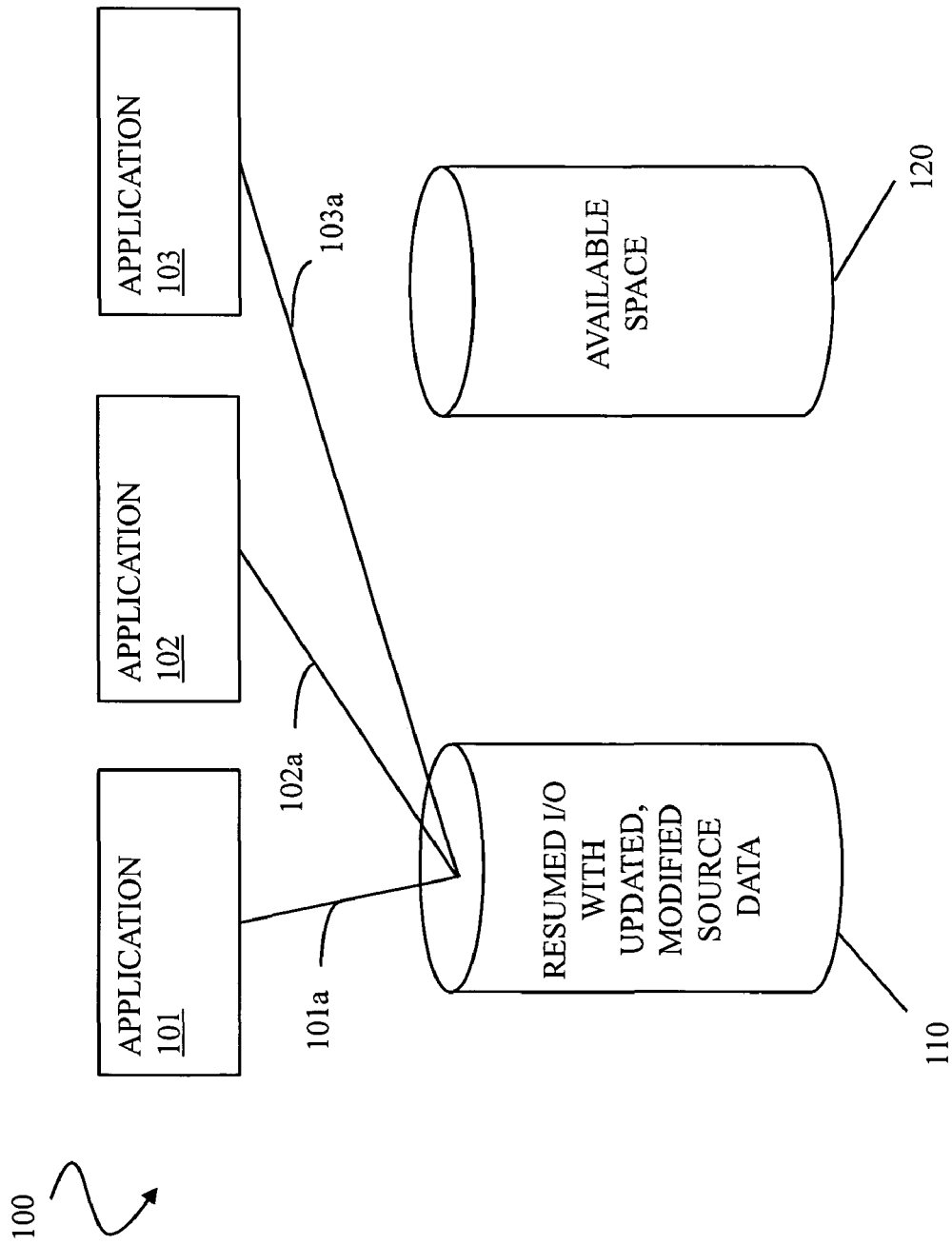

FIG. 8 shows the applications 101-103 resuming I/O operations on the source data in its new modified state in the source area 120, for example, following a diverting and/or redirecting process of the applications 101-103 similar to that previously discussed in connection with the initial diverting of the I/O operations to the holding area 120. At this point, the source data has been modified in accordance with the in-place data modification process and has been properly updated to reflect I/O operations that were conducted on the data copy during the in-place data modification processing. In various embodiments, following the resuming of I/O operations to the new modified source data, the applications 101-103, and/or a layer between the applications 101-103 and the source area 110, may determine that the source data has been modified and may perform subsequent I/O operations to the source area 110 in a similarly modified state as the modified source data.

The holding area 120 may be made available for the next in-place modification process and/or for other application usage having been used only temporarily for the in-place data modification described in connection with the system described herein. In other embodiments, as further discussed elsewhere herein, the holding area 120 may retain the data copy with updates for a period of time to be used a back-up copy of the data in the event that it is necessary or desirable to discard the original source data due to, for example, an error in the in-place modification processing performed on the source data. Alternatively, the holding area 120 may maintain the data copy with updates and become the new source area for subsequent in-place data modification processing, for example in the event of corrupted data at the source area 110 following the in-place data modification processing, in which case I/O operations of the applications 101-103 may be continued in the holding area 120 and not diverted back to the source area 110.

In another embodiment, the applications 101-103, and/or a layer between the applications and the source area 110 and/or the holding area 120, may perform I/O operations to both the source area 110 and the holding area 120 during the in-place modification process. Accordingly, the applications 101-103, and/or the above-noted layer inbetween, may perform an unmodified I/O operation to the holding area 120. For example, in the case of in-place encryption processing, an unencrypted (clear-text) I/O operation (e.g., write operation) may be made to the data copy in the holding area 120. In conjunction therewith, the applications 101-103, and/or the above-noted layer in between, may perform an equivalent modified (e.g., encrypted) I/O operation to the source data undergoing in-place encryption in the source area 110. In this way, it is not necessary to track changes made to the data copy using an SDDF map and/or any other change tracking process. The on-going I/O operations of the applications 101-103 will be made to both the data copy, as a back-up copy, and to the source data. Alternatively, or additionally, the applications 101-103, and/or the layer therebetween, may determine whether a new I/O operation to be made to source data is to a portion of the source data that has not yet been modified as part of the in-place modification processing. An I/O (write) operation may be conducted in unmodified form to both the data copy in the holding area 120 and the source area 110 if it is determined that the write operation is to data of the source area 110 that has not yet been modified in-place.

Figure 9:
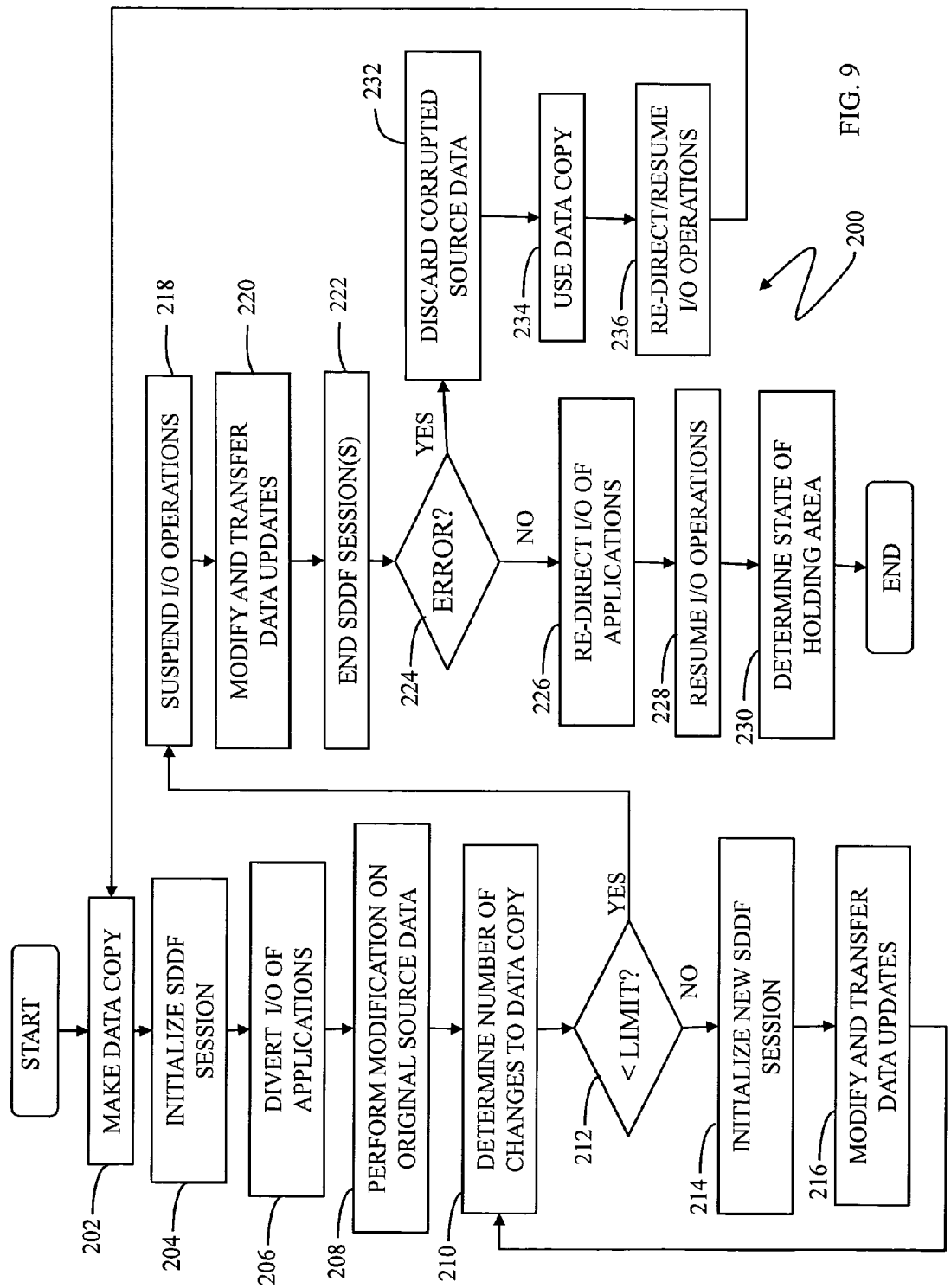
FIG. 9 is a flow diagram showing non-disruptive modification of data in-place according to various embodiments of the system described herein.

FIG. 9 is a flow diagram 200 showing non-disruptive modification of data in-place according to various embodiments of the system described herein. At a step 202, a copy of data from the source area 110 is made to the holding area 120. After the step 202, processing proceeds to a step 204 where an SDDF session is initialized to track changes made to the data copy. In various embodiments, initialization of an SDDF session according to the step 204 may include creation and activation of one or more SDDF sessions and establishes one or more SDDF session bitmaps in which a bit of the SDDF session bitmap is set whenever a corresponding track (or other appropriate data increment) is written, as further discussed elsewhere herein. Initialization of the SDDF session may also include setting a counter to 0, the counter being used to determine the number of tracks changed, for example, by being incremented whenever a bit is set on the SDDF session bitmap to indicate a changed data track, as further discussed elsewhere herein. The SDDF session may be initialized at the step 204 simultaneously with creating the copy at the step 202. In any event, no modifications may be made to the copy (or the original) until the SDDS session is initialized (and activated) at the step 204.

After the step 204, processing proceeds to a step 206 where I/O operations of the applications 101-103 are diverted from the source data in the source area 110 to the data copy in the holding area 120. After the step 206, processing proceeds to a step 208 where the source data in the source area 110 is modified, for example, by being encrypted and/or other modification process as further discussed elsewhere herein. Note that any type of data modification/transformation may be performed at the step 208, such as storage data encryption like that described in published U.S. patent application 20060242431, which is incorporated by reference herein.

After the step 208, processing proceeds to a step 210 where a determination is made as to the number of changes, e.g., changed tracks with updated data, to the data copy that have occurred. In an embodiment, the determination may be made by examining the SDDF session bitmap counter. As further discussed herein, the counter may be a result of incrementing each time a bit is set in the SDDF session bitmap. In another embodiment, at the step 210 a determination may be made by traversing the SDDF session bitmap and determining then the number of bits that have been set in the SDDF session bitmap without maintaining an incrementing counter. The LIMIT used at the step 210 may be any appropriate value, such as 5% of the total number of tracks.

After the step 210, processing proceeds to a test step 212 where it is determined if the number of changes made to tracks (and/or other data segment) of the data copy is less than a threshold limit. If the number of changes is not less than the threshold limit (<LIMIT is NO), meaning the data copy has been updated to change a number of data tracks that equal or exceed the threshold limit, then processing proceeds to a step 214. At the step 214 a new SDDF session is initialized to create and activate a new SDDF bitmap to track new changes to be made to the data copy from its currently-updated state. The initialization may include setting a counter to 0 to track the number of further updates made to the data copy. In an embodiment, as part of this process, the old SDDF session may be deactivated. After the step 214, processing proceeds to a step 216 where the updates to the data copy, as compared with the prior data copy version which may be, for example, the copy of the original source data in a first iteration of the flow diagram and determined using the old SDDF session bitmap, are modified in accordance with the modification of the source data, e.g., encrypted, and transferred to the source area 110 to be incorporated into the modified source data and yielding updated, modified source data at the source area 110. After the step 216, processing proceeds back to the step 210 to determine the number of changes made to the data copy that have occurred while the previous updates have been modified and transferred to the source data in connection with the step 216.

If at the step 210 it is determined that a number of changes made to the data copy is less than the threshold limit (<LIMIT is Yes), then processing proceeds to a step 218 where I/O operations of the applications 101-103 are suspended. After the step 218, processing proceeds to a step 220 where the updates to the data copy, determined using the SDDF session bitmap, are modified in accordance with the modification of the source data, e.g., encrypted, and transferred to the source area 110 to be incorporated into the modified source data and yielding updated, modified source data at the source area 110. After the step 220, processing proceeds to a step 222 where open SDDF sessions may be ended, which may included terminating one or more of the SDDF sessions and/or deactivating the sessions and/or clearing the bits thereof, as further discussed elsewhere herein.

After the step 222, processing proceeds to a test step 224 where it is determined if there has been any errors made in the modification processing of the original source data which has corrupted that data in the source area 110. Errors to the data in the source area 110 may be determined using known error detection techniques. If no errors are detected and the data in the source area is determined to not be corrupted, then processing proceeds to a step 226 where the I/O operations of the applications 101-103 are re-directed from the holding area 120 back to the source area 110 that includes the modified, updated source data. After the step 226, processing proceeds to the step 228 where the I/O operations of the applications are resumed with respect to the data in the source area 110. Note that, in some cases, when I/O operations are resumed with respect to the data in the source area 110, the application may handle data differently and may transform data prior to reading or writing. For example, if the data has been encrypted, then processing at the step 228 may include causing the application to encrypt data prior to performing a write and to decrypt data after the data is read. In other cases, it is possible to switch applications altogether so that a different application would be accessing the source area 110 than the application that had been accessing the source area 110 prior to the transformation.

As further discussed elsewhere herein, the re-directing of the I/O operations of the applications 101-103 and/or resuming of I/O operations may be controlled using components of the storage device 20 and may include informing the components of the storage device 20 and/or the applications 101-103 that further I/O operations of the applications 101-103 with respect to the source data in the source area 110 are to be performed in accordance with the modification processing that was conducted on the source data. That is, subsequent I/O operations of the applications 101-103, such as write to the data in the source area 110, may be made with the same modification processing, such as encryption, that was performed to the data in the source area 110. In another embodiment, the I/O operations of the applications 101-103 may not be modified; however, a mechanism, such as SDDF, would then be needed to determine which data in the source area 110 is unmodified data. Such a determination of unmodified data may be used in subsequent processing of the data in the source area 110 according to the system described herein.

After the step 228, processing proceeds to a step 230 where the state of the holding area 120 is determined. In an embodiment, the space of the holding area 120 may be freed for subsequent use in connection with the step 230. In another embodiment, the data in the holding area 120 may be maintained as a data back up. After the step 230, processing is complete.

If at the test step 224 it is determined that there are errors in the data in the source area 110 resulting from the modification processing that has corrupted the data in the source area 110, then processing proceeds to a step 232. At the step 232, the corrupted source data in the source area 110 is discarded. After the step 232, processing proceeds to a step 234 where the data in the holding area 120, which has been kept updated with I/O operations from the applications 101-103 as further discussed elsewhere herein, may be used to generate a new copy of uncorrupted source data. In an embodiment, the updated data from the holding area 120 may be copied to the source area 110 and, for example, overwrite the corrupted data in the source area 110. The data copy in the holding area 120 may then be freed for subsequent use and/or maintained as a data back-up. In another embodiment, the holding area 120 with the updated data copy may become a new source area for subsequent data modification processing. That is, the data that was copied to the holding area may be made to become the source data for the in-place modification processing. After the step 234, processing proceeds to a step 236 where I/O operations may be re-directed and/or resumed. That is, if the updated data in the holding area 120 was copied back to the source area 110 in a recovery process, then I/O operations of the applications 101-103 may be re-directed to the source area 110 and the I/O operations resumed. Alternatively, if the holding area is converted into a new source area, then re-directing of the I/O operations may not be necessary, and I/O operations of the applications 101-103 may be resumed on the data in the new source area that was previously the holding area 120. After the step 236, processing proceeds back to the step 202 to begin again modification processing of the source data in connection with the system described herein.

Figure 10:
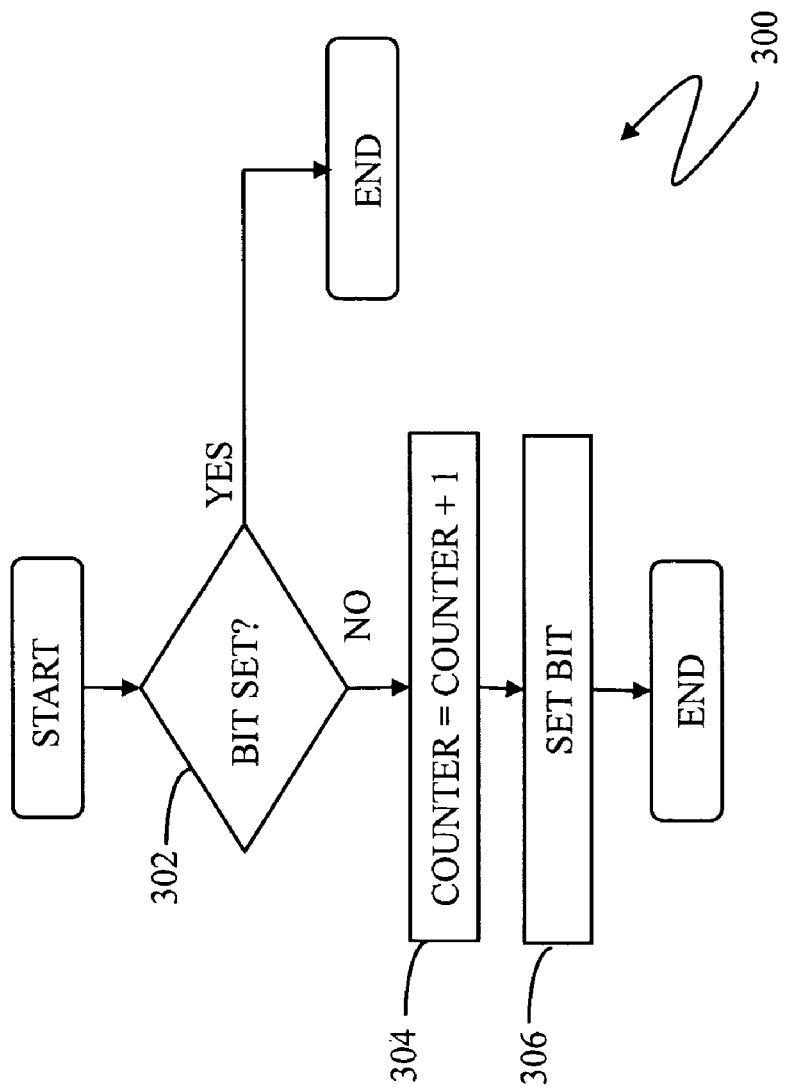
FIG. 10 is a flow diagram showing processing in connection an SDDF session according to an embodiment of the system described herein.

FIG. 10 is a flow diagram 300 showing processing in connection an SDDF session according to an embodiment of the system described herein. SDDF is further discussed elsewhere herein. The flow diagram 300 shows incrementing of a counter in connection with tracking of a data change according to bit identification and/or other traversal of an SDDF session bitmap. At a test step 302, it is determined whether a bit for a track, or other data segment, has been set in connection with a change of data in accordance with the tracking of data changes using a SDDF session bitmap. If the bit is already set, e.g., to the value of 1, then processing is complete and, for example, no counter needs to be incremented since the set bit indicates that changed data track has already been registered in connection with the SDDF session. If the bit associated with data that has been changed in connection with the SDDF session has not been set, then processing proceeds to a step 304 where the counter is incremented by 1. Use of the counter in connection with the system described herein is further discussed elsewhere herein. After the step 304, processing proceeds to a step 306 where the bit is then set, e.g., to the value 1. After the step 306, processing is complete.

Various of the embodiments discussed herein may be appropriately combined with each other in connection with the system described herein. Further, the system described herein may be implemented using software, hardware, and/or a combination of software and hardware where software may be stored in an appropriate storage medium and executed by one or more processors. The system described herein may be applicable to any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for modification of data, comprising:
copying source data in a source storage area into a holding storage area to create a data copy, wherein the source data is data that is to modify;
diverting I/O operations of an application that accesses the source data to the data copy in the holding storage area;
tracking changes to the data copy in the holding storage area;
modifying the source data to generate modified source data in the source storage area; and
incorporating the changes to the data copy in the holding storage area into the modified source data in the source area.

2. The method according to claim 1, further comprising:
re-directing the I/O operations to the modified source data in the source storage area.

3. The method according to claim 1, further comprising:
after incorporating the changes to the data copy into the modified source data, making storage space in the holding storage area available for subsequent use.

4. The method according to claim 1, after incorporating the changes to the data copy into the modified source data, maintaining the data copy in the holding storage area as a back-up data copy.

5. The method according to claim 1, wherein modifying the source data includes encrypting the source data.

6. The method according to claim 1, wherein incorporating the changes to the data copy into the modified source data includes modifying the changes to the data copy and transferring the modified changes to the source storage area.

7. The method according to claim 6, further comprising:
suspending the I/O operations if a number of changes to the data copy is less than a threshold limit;
modifying final remaining changes to the data copy as final modified changes;
transferring the final modified changes to the modified source data;
re-directing the I/O operations to the modified source data in the source storage area; and
resuming the I/O operations.

8. The method according to claim 1, wherein tracking changes to data copy includes using an SDDF session.

9. A storage device, comprising:
a source storage area;
a holding storage area;
at least one processor including executable code stored on a computer-readable medium, the executable code including:
executable code that copies source data in a source storage area into a holding storage area to create a data copy, wherein the source data is data that is to modify;
executable code that diverts I/O operations of an application that accesses the source data to the data copy in the holding storage area;
executable code that tracks changes to the data copy in the holding storage area;
executable code that modifies the source data to generate modified source data in the source storage area; and executable code that incorporates the changes to the data copy in the holding storage area into the modified source data in the source area.

10. The storage device according to claim 9, wherein the at least one processor further includes:
executable code that re-directs the I/O operations to the modified source data in the source storage area.

11. The storage device according to claim 9, wherein the at least one processor further includes:
executable code that, after incorporating the changes to the data copy into the modified source data, makes storage space in the holding storage area available for subsequent use.

12. The storage device according to claim 9, wherein the at least one processor further includes:
executable code that, after incorporating the changes to the data copy into the modified source data, maintains the data copy in the holding storage area as a back-up data copy.

13. The storage device according to claim 9, wherein the at least one processor further includes:
executable code that modifies the source data by encryption.

14. The storage device according to claim 9, wherein the executable code that incorporates the changes to the data copy into the modified source data includes executable code that modifies the changes to the data copy and transfers the modified changes to the source storage area.

15. The storage device according to claim 14, wherein the at least one processor further includes:
executable code that suspending the I/O operations if a number of changes to the data copy is less than a threshold limit;
executable code that modifies final remaining changes to the data copy as final modified changes;
executable code that transfers the final modified changes to the modified source data;
executable code that re-directs the I/O operations to the modified source data in the source storage area; and
executable code that resumes the I/O operations.

16. The storage device according to claim 9, wherein the executable code that tracks changes to data copy includes executable code used in an SDDF session.

17. The storage device according to claim 9, further comprising:
a plurality of interconnected directors, wherein at least some of the directors handle reading and writing data for the storage device, and wherein at least one of the directors includes the at least one processor.

18. Computer software, stored on a computer-readable medium, for modifying data in-place, comprising:
executable code that copies source data in a source storage area into a holding storage area to create a data copy, wherein the source data is data that is to modify;
executable code that diverts I/O operations of an application that accesses the source data to the data copy in the holding storage area;
executable code that tracks changes to the data copy in the holding storage area;
executable code that modifies the source data to generate modified source data in the source storage area; and
executable code that incorporates the changes to the data copy in the holding storage area into the modified source data in the source area.

19. The computer software according to claim 18, wherein the executable code that incorporates the changes to the data copy into the modified source data includes executable code that modifies the changes to the data copy and transfers the modified changes to the source storage area.

20. The computer software according to claim 19, further comprising:
executable code that suspends the I/O operations if a number of changes to the data copy is less than a threshold limit;
executable code that modifies final remaining changes to the data copy as final modified changes;
executable code that transfers the final modified changes to the modified source data;
executable code that re-directs the I/O operations to the modified source data in the source storage area; and
executable code that resumes the I/O operations.

\* \* \* \* \*